US006715653B2

(12) United States Patent
DeCosta

(10) Patent No.: US 6,715,653 B2
(45) Date of Patent: Apr. 6, 2004

(54) ADJUSTABLE RACK AND CLAMPING APPARATUS FOR REMOVABLY RETAINING SURFBOARDS OR THE LIKE ON A VEHICLE

(76) Inventor: David York DeCosta, 2420 Zeder Ave., Delray Beach, FL (US) 33484

( * ) Notice: Subject to any disclaimer, the term of this patent is extended or adjusted under 35 U.S.C. 154(b) by 13 days.

(21) Appl. No.: 09/847,983

(22) Filed: May 4, 2001

(65) Prior Publication Data

US 2002/0162868 A1 Nov. 7, 2002

(51) Int. Cl.[7] ............................................... B60R 9/048
(52) U.S. Cl. ..................... 224/324; 441/74; 248/229.15
(58) Field of Search ................................. 224/324, 325, 224/321, 315, 329, 330, 331, 310, 568, 570, 545, 924; 70/18, 58, 57, 14; 441/74; 248/229.15, 229.25, 228.6, 230.6, 237.71

(56) References Cited

U.S. PATENT DOCUMENTS 4,896,519 A * 1/1990 Pitts ............................... 70/18
5,582,044 A * 12/1996 Bolich ......................... 224/315
5,706,680 A * 1/1998 Wroble ............................ 211/4
5,769,291 A * 6/1998 Chasan ......................... 224/318
6,164,507 A * 12/2000 Dean et al. .................. 224/319

FOREIGN PATENT DOCUMENTS

| EP | 103924 | * | 3/1984 | .................. 224/324 |
| GB | 2250492 | * | 6/1992 | .................. 224/324 |

* cited by examiner

Primary Examiner—Lee Young
Assistant Examiner—Lein Ngo
(74) Attorney, Agent, or Firm—Martin Sachs, Esq.

(57) ABSTRACT

An adjustable rack and clamping apparatus for removably retaining surfboards or the like to the roof of a vehicle, while preventing the theft thereof, includes a plurality of two types of mounting block assemblies that slideably attach to two transversely disposed mounting bars removably affixed to the vehicle.

11 Claims, 3 Drawing Sheets

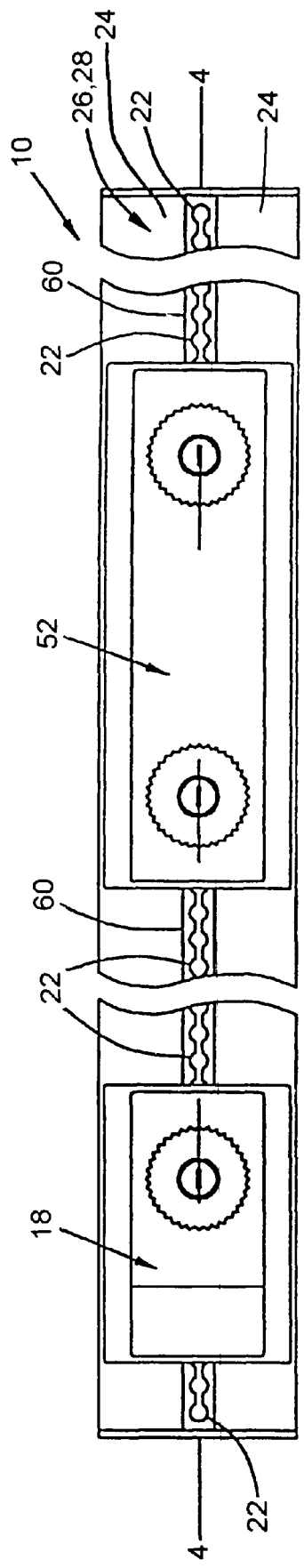
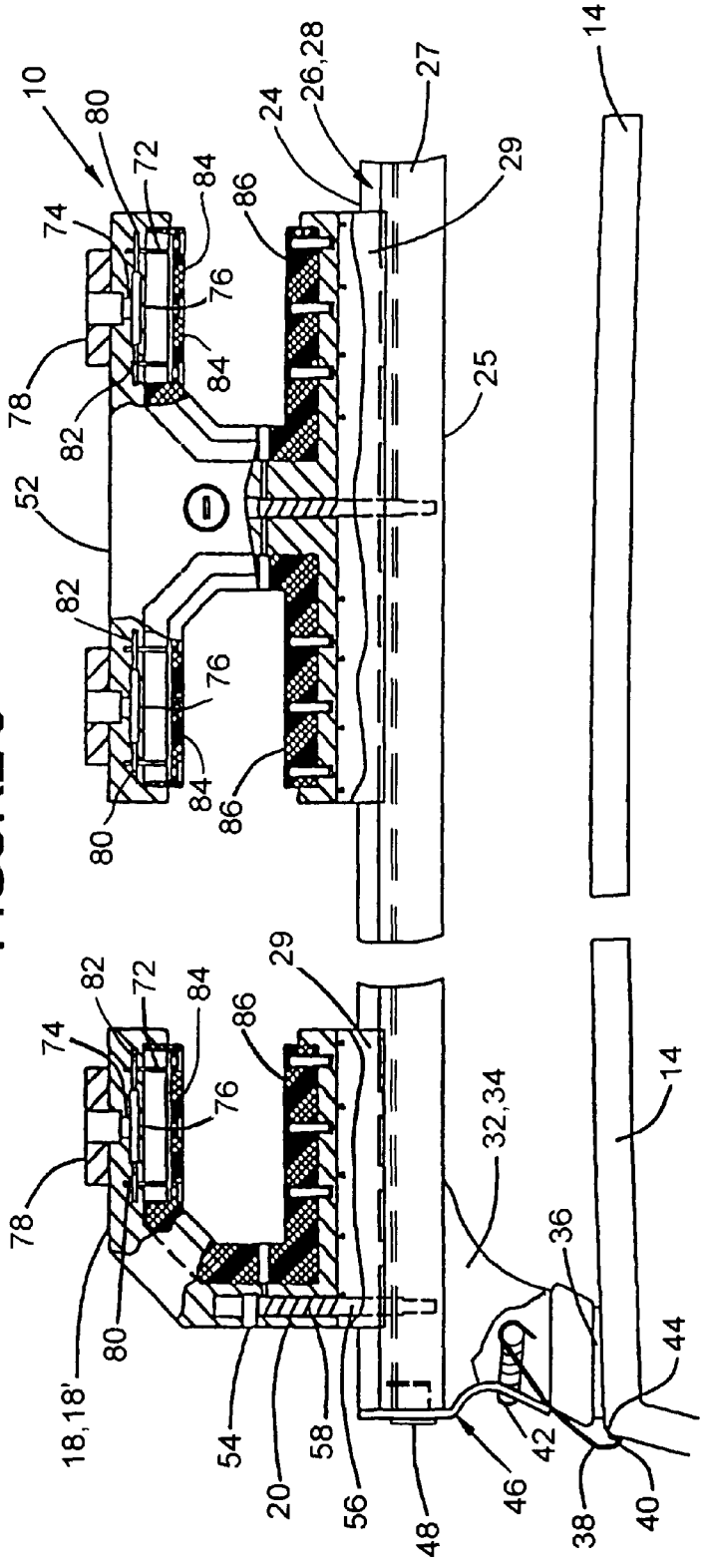
FIGURE 3
FIGURE 4

ADJUSTABLE RACK AND CLAMPING APPARATUS FOR REMOVABLY RETAINING SURFBOARDS OR THE LIKE ON A VEHICLE

BACKGROUND OF THE INVENTION

1. Field of the Invention

The present invention relates to an apparatus for rigidly and removably retaining surfboards or the like to a vehicle, while preventing the theft thereof.

2. Discussion of the Relevant Art

The prior art discloses devices used for affixing surfboards and the like to the roof of vehicles that are provided with a roof carrier, roof bars or brackets that fasten to the walls of a truck bed. However, none disclose affixing a device to the conventional rain gutter provided over the doors of a conventional vehicle.

The prior art abounds with devices for affixing surfboards or the like to the roof of vehicles during transport, such as, the patent issued to Langbauer (U.S. Pat. No. 4,381,070) on Apr. 26, 1983. This device does not disclose a means for preventing theft of the transported article.

The patent to San Juan (U.S. Pat. No. 4,717,055) issued on Jan. 5, 1988, discloses a bracket that utilizes conventional ski and surfboard racks to position the skis and surfboards over the truck bed. The patents to Finnegan et al. (U.S. Pat. No. 4,867,362) issued Sep. 19, 1989 and Tittel (U.S. Pat. No. 4,930,71) issued Jun. 5, 1990 disclose means for mounting a ski carrier attachment onto the carrier bar of an automobile roof carrier.

However, there is no showing or suggestion of an apparatus for rigidly and removably retaining surfboards or the like to a vehicle utilizing the conventional rain gutter, door jam or the like, provided over the doors of a conventional vehicle, while preventing the theft thereof.

SUMMARY OF THE INVENTION

Therefore, it is an object of the present invention to overcome the shortcomings of the prior art and provide a simple apparatus that is readily installed on the roof of a vehicle, while preventing the theft of the article mounted thereon.

It is another object of the present invention to provide a relatively inexpensive apparatus for transporting surfboards while preventing damage thereto, as well as, protecting the vehicle on which it is mounted.

It is yet another object of the present invention to provide an apparatus to transport a single surfboard or a pair thereof, with the same theft protection.

An adjustable rack and clamping apparatus for rigidly and removably retaining surfboards or the like to a vehicle, while preventing the theft thereof, according to the principles of the present invention, include a pair of mounting bars with support means disposed beneath the distal ends of each of the mounting bars disposed transverse to the longitudinal axis of the vehicle, a pair of generally I-shaped clamping mechanisms, one of which is generally centrally disposed on each of the mounting bars, at least two generally C-shaped clamping mechanisms, one of which is slideably disposed on each said mounting bar on at least one side of the generally I-shaped clamping mechanisms, each of the I-shaped and said C-shaped clamping mechanisms are provided with an anchor means adapted to cooperate with mating anchor means disposed on the mounting bars to hold the I-shaped and the C-shaped clamping mechanisms in a fixed position and means for fastening the mounting bar support means together with the mounting bar to the roof of the vehicle.

The foregoing and other objects and advantages will appear from the description to follow. In the description, reference is made to the accompanying drawing, which forms a part hereof and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims. Like-reference characters are utilized to designate like or corresponding components in the various views, in order for the reader to better understand features of the invention.

BRIEF DESCRIPTION OF THE DRAWINGS

In order that the invention may be more fully understood, it will now be described by way of example, with reference to the accompanying drawings in which:

FIG. 3 is a top plan view of a mounting bar and clamping devices used to hold a surfboard to the roof of the vehicle; and FIG. 4 is an end view in elevation, partially in cross-section of the mounting bar, along the line 4—4 of FIG. 3, showing the C-shaped and the I-shaped clamping mechanisms, with a cooperating locking device disposed therein.

DESCRIPTION OF THE PREFERRED EMBODIMENT

Figure 1:
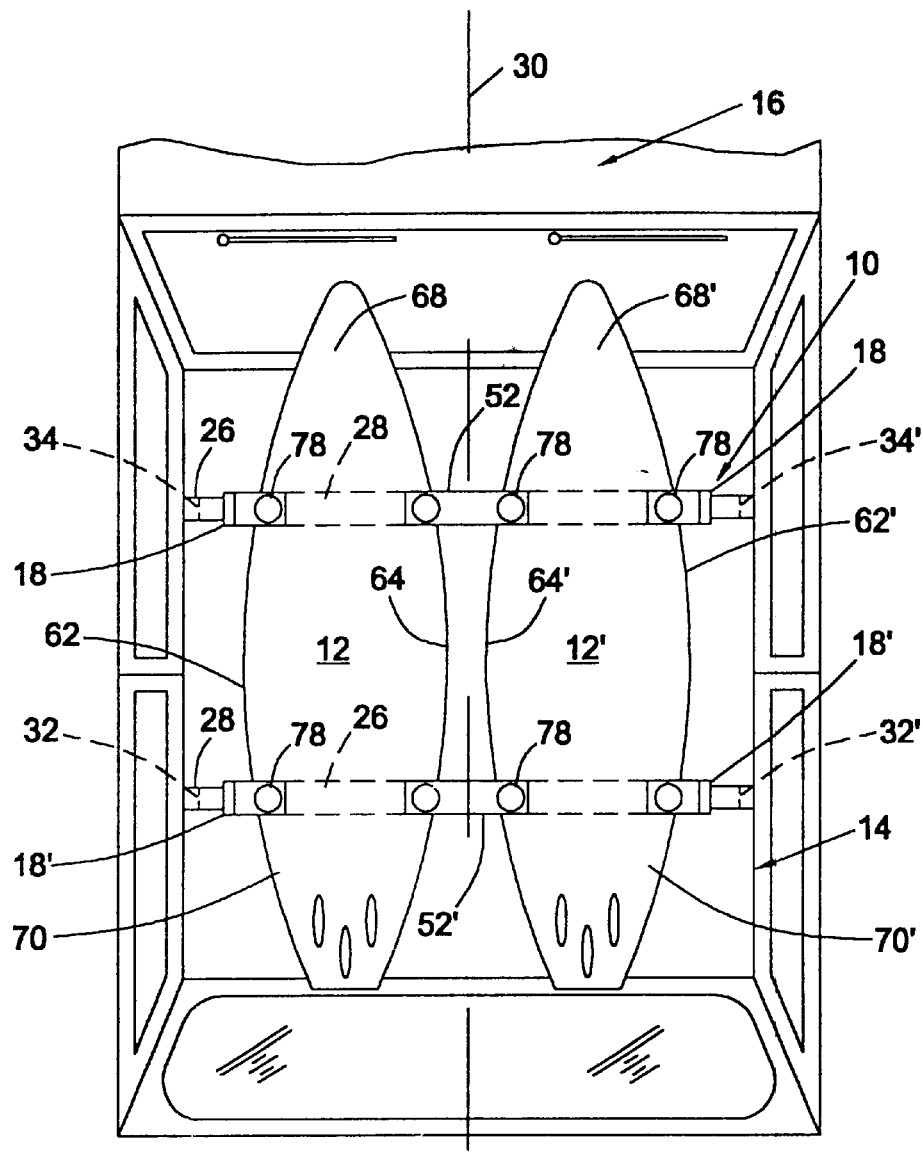
FIG. 1 is a top plan view of a pair of surfboards removably affixed upon the roof portion of an automobile, according to the principals of the present invention.
Figure 2:
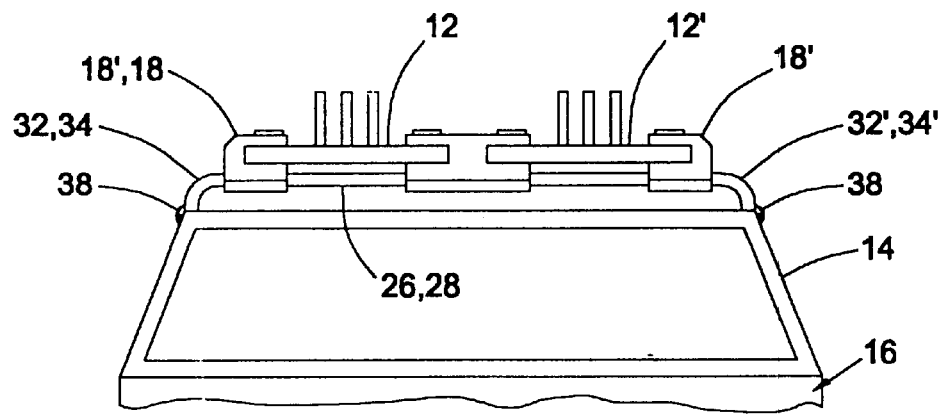
FIG. 2 is a rear view of the of the vehicle of FIG. 1, showing the roof portion thereof with two surfboards disposed thereon.
Figure 5:
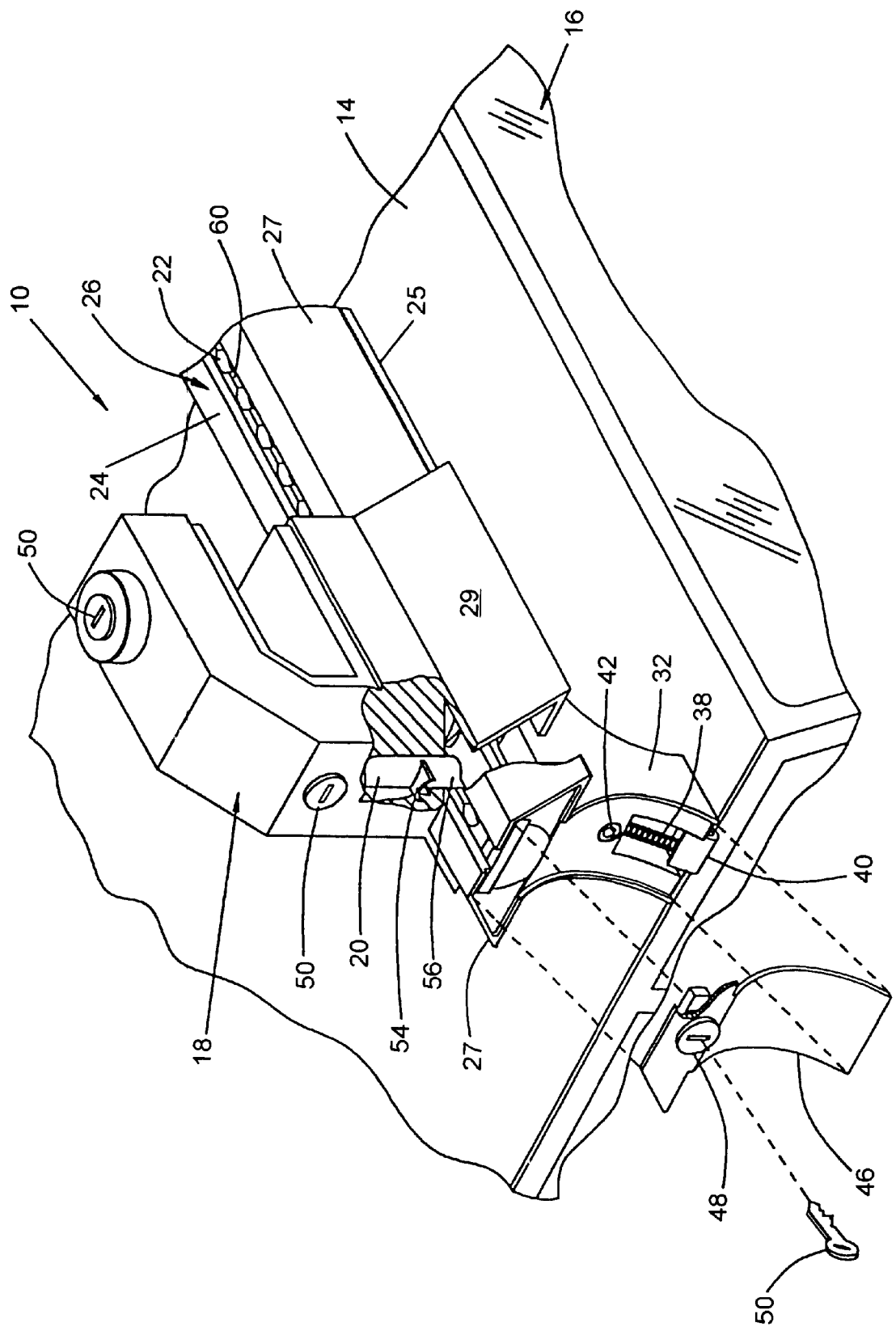
FIG. 5 is a perspective view, in elevation and partially broken away, showing the C-shaped clamping mechanism, shown in FIG. 4, disposed upon a mounting bar affixed to the roof of a vehicle, by means of a hook member affixed to the rain gutter of a vehicle.

Referring to the figures and in particular to FIGS. 1–4, there is shown an adjustable lower rack and clamping apparatus 10 for removably retaining surfboards 12 and 12' or the like, on the roof 14 of a vehicle 16, according to the principals of the present invention. The adjustable rack and clamping apparatus 10 is seen to include a generally C-shaped (in cross-section) clamping mechanism 18 and 18' that includes an anchor pin device 20 (see FIG. 5) designed to cooperate with any one of the anchor receptacles (apertures) 22, as needed, provided in the upper surface 24 of the mounting bars 26 and 28.

The lower surface 25 of the mounting bars 26 and 28 are provided with an outwardly extending skirt portion 27 (see FIG. 5), adapted to slideably cooperate with a skirt portion 29 provided on the I-shaped clamping mechanism 52 and the C-shaped clamping mechanism 18.

The mounting bars 26 and 28 are spaced apart and are disposed transverse to the longitudinal axis 30 of the vehicle 16, onto which the rack and clamping apparatus 10 is to be mounted. The mounting bars 26 and 28 are each supported by a pair of mounting bar supports 32, 32' and 34, 34', respectively, disposed at the distal ends of the mounting bars 26 and 28. The mounting bar supports 32, 32' and 34, 34', respectively, have a resilient protective pad, such rubber, 36 placed between the bar supports 32, 32' and 34, 34' and the roof 14 of the vehicle 16 to prevent any damage to the roof 14, when the adjustable rack and clamping apparatus 10 is affixed thereon.

The mounting bar supports 32, 32' and 34, 34', respectively, are affixed to the roof 14 of the vehicle 16 with a mounting bar anchor 38, which has a hook portion 40 that clamps the rain gutter 44, or inner door jam of the vehicle 16. The tension on hook portion 40 is adjusted by the control screw 42 (see FIG. 5) that is inaccessible once the end cap bracket 46 is in position. The end cap bracket 46 includes a locking device 48, which is locked in place with the aid of a key 50. The key 50 may also be used to lock the C-shaped clamping mechanism 18 and the I-shaped clamping mechanism (in cross-section), described hereinafter, with like numerals referring to similar components. The I-shaped clamping mechanism 52 may be considered two C-shaped clamping mechanisms 18 connected back-to-back having only one anchor pin mechanism 20.

The anchor pin device 20, disposed in the C-shaped clamping mechanism 18 or 18' may be raised or lowered by the lever 54 affixed on the anchor pin 56. A spring 58 disposed on the anchor pin 56 raises the anchor pin 56 so that it may readily move within the channel 60 provided between the anchor receptacles 22 provided in the anchor bars 26 and 28, where it is stopped when it comes into contact with the edges 62 and 62' of the surfboards 12 and 12', respectively. The anchor pin 56 is then lowered into one of the anchor receptacles 22 and locked into place with the key 50, which rotates a cam, not shown, to hold the anchor pin in a depressed or locked position. In a like manner, the I-shaped clamping mechanism 52 may be locked in position.

Generally, the I-shaped clamping mechanism 52 is disposed in the central portion of the mounting bars 26 and 28 to allow for the mounting of a second surfboard 12', which has one edge 64' locked therein. Thus, one I-shaped clamping mechanism 52, will clamp a surfboard 12 on one side and another surfboard 12' on the other side. A pair of C-shaped clamping mechanisms 18 juxtaposed on either side of I-shaped clamping mechanism 52 will anchor the surfboard 12 and 12' on one end 68 and 68' thereof and in a like manner the other end 70 and 70' will also be clamped by two C-shaped clamping mechanisms 18' juxtaposed on either side of I-shaped clamping mechanism 52'.

Both of the I-shaped clamping mechanisms 52 and 52' and the C-shaped clamping mechanisms 18 and 18' are provided with a vertical clamping device 72 for providing pressure on the top portions of the clamping mechanisms to hold the surfboards in the open portions thereof The device 72 includes a central shaft 72 provided with a knob 78 disposed on one distal end thereof and a central gear 76 disposed on the other distal end thereof The gear 76 has a pair of juxtaposed gears 80 and 82 cooperating therewith, that are coupled to a plate 84 that moves up and down in a vertical plane depending upon the direction of rotation of the knob 78. By increasing the pressure that can be placed on the resilient lining 86 provided in the circumferential openings of the I-shaped clamping mechanisms 52 and 52' and the C-shaped clamping mechanisms 18 and 18' the surfboards can be firmly clamped therein.

In operation, the adjustable rack and clamping apparatus 10 is affixed to the roof of vehicle 16 by means of the hook 40 clamping on to the rain gutters 44, or the like, provided thereon. The I-shaped clamping mechanisms 52 and 52' are positioned and locked in place on the mounting bars 26 and 28. Thereafter a surfboard or the like is placed with one edge thereof into the openings of the I-shaped clamping mechanisms 52 and 52'. Then the C-shaped clamping mechanisms 18 and 18' are placed on the mounting bars and moved into position to firmly contact the edge 62 of the surfboard can be locked in position. This procedure may be repeated when a second surfboard is to be carried along side the first one. The vertical clamping devices 72 are then adjusted by rotating knobs 78 until firm pressure is exerted on the surfboards 12 and 12', clamping them into the adjustable rack and clamping apparatus 10. The end cap brackets 46 are then locked into position on the mounting bar supports 32,32' and 34 and 34'.

Hereinbefore has been disclosed a simple, reliable and relatively inexpensive adjustable rack and clamping apparatus for removably retaining surfboards or the like on the roof of a vehicle and preventing them from theft.

Having thus set forth the nature of the invention, what is claimed is:

1. An adjustable rack and clamping apparatus for removably retaining surfboards on the roof of a vehicle comprising:
   A. at least two spaced apart mounting bars disposed transverse to the longitudinal axis of the vehicle, each said mounting bar being provided with a plurality of anchor apertures extending the length of said mounting bar;
   B. a pair of generally I-shaped clamping mechanisms, one of which being generally centrally disposed on each of said mounting bars, each said I-shaped clamping mechanisms being provided with an anchor device adapted to cooperate with one of said anchor apertures to lock said I-shaped clamping mechanism in position;
   C. at least two generally C-shaped clamping mechanisms, one of which being slideably disposed on each said mounting bar on at least one side of said generally I-shaped clamping mechanisms, each said C-shaped clamping mechanisms being provided with an anchor device adapted to cooperate with one of said anchor apertures to hold said C-shaped clamping mechanism in a fixed position;
   D. a mounting bar support means disposed beneath the distal ends of each of said mounting bars slideably cooperating therewith; and
   E. means for fastening said mounting bar support together with said mounting bar to the roof of said vehicle;
   wherein a surfboard is removably retained between said C-shaped clamping mechanisms and said I-shaped clamping mechanisms.

2. An adjustable rack and clamping apparatus for removably retaining surfboards on the roof of said vehicle, according to claim 1, further including, two additional C-shaped clamping mechanisms, one of which is slideably disposed on each said mounting bar on the other side of said generally I-shaped clamping mechanisms for removably retaining two surfboards.

3. An adjustable rack and clamping apparatus, according to claim 1, wherein said mounting bars include a longitudinally extending lip portion for cooperating with a mating lip portion provided on said C-shaped clamping mechanisms and said generally I-shaped clamping mechanisms to prevent vertical movement between said mounting bars and said clamping mechanisms.

4. An adjustable rack and clamping apparatus, according to claim 1, wherein said C-shaped clamping mechanisms and said generally I-shaped clamping mechanisms include a key lock mechanism for locking said anchor device into a selected anchor aperture disposed on said mounting bar.

5. An adjustable rack and clamping apparatus, according to claim 1, wherein said C-shaped clamping mechanisms and said generally I-shaped clamping mechanisms include resilient pads disposed within said clamping mechanisms.

6. An adjustable rack and clamping apparatus, according to claim 5, wherein said C-shaped clamping mechanisms and said generally I-shaped clamping mechanisms are provided with an adjustable means for applying adjustable pressure to said resilient pads disposed within said clamping means for retaining said surfboard therewithin.

7. An adjustable rack and clamping apparatus, according to claim 1, wherein said mounting bar support means includes a resilient protective pad disposed between the roof of the vehicle and the bottom of the support means.

8. An adjustable rack and clamping apparatus, according to claim 1, wherein said mounting bar support includes a holding means for holding said support to the roof of said vehicle.

9. An adjustable rack and clamping apparatus, according to claim 1, further including a key lock disposed within said C-shaped clamping mechanism to lock said C-shaped clamping mechanism in a fixed position when activated.

10. An adjustable rack and clamping apparatus, according to claim 1, further including a key lock disposed in said end cap bracket means for preventing the removal of said rack and clamping apparatus unless activated with a proper key.

11. An adjustable rack and clamping apparatus for removably retaining surfboards on the roof of a vehicle comprising:

A. at least two spaced apart mounting bars disposed transverse to the longitudinal axis of the vehicle, each said mounting bar having:
　　a) a plurality of anchor apertures extending the length of said mounting bar, and
　　b) a longitudinally extending lip portion;
　B. a pair of generally I-shaped clamping mechanisms, one of which being generally centrally disposed on each of said mounting bars, each said I-shaped clamping mechanisms having:
　　a) an anchor device adapted to cooperate with one of said mounting bar anchor apertures to lock said I-shaped clamping mechanism in position,
　　b) resilient pads disposed within said I-shaped clamping mechanisms,
　　c) adjustable means for applying adjustable pressure to said resilient pads for retaining said surfboard within said clamping mechanisms,
　　d) a longitudinally extending lip portion for cooperating with said mating lip portion provided on said mounting bar, and,
　　e) a key lock mechanism for locking said anchor device into a selected anchor aperture disposed on said mounting bar
　C. at least two generally C-shaped clamping mechanisms, one of which being slideably disposed on each said mounting bar on at least one side of said generally I-shaped clamping mechanisms, each said C-shaped clamping mechanisms having:
　　a) an anchor device adapted to cooperate with one of said mounting bar anchor apertures to lock said C-shaped clamping mechanism in a fixed position,
　　b) resilient pads within said C-shaped clamping mechanisms,
　　c) adjustable means for applying pressure to said resilient pads disposed within said clamping means for retaining said surfboard within said openings,
　　d) a longitudinally extending lip portion for cooperating with said mating lip portion provided on said mounting bar, and
　　e) a key lock mechanism for locking said anchor device into a selected anchor aperture disposed on said mounting bar;
　D. a mounting bar support disposed beneath the distal ends of each of said mounting bars slideably cooperating therewith, said mounting bar support having:
　　a) holding means for holding said mounting bar support to the roof of said vehicle, and
　　b) a resilient protective pad disposed between the roof of said vehicle and the bottom of said support;
　E. means for fastening said mounting bar means together with said mounting bar to the roof of said vehicle; and
　F. an end cap bracket means having a key lock disposed therein for preventing the removal of said rack and clamping apparatus unless unlocked with a proper key;
wherein a surfboard is removably retained between said C-shaped clamping mechanisms and said I-shaped clamping mechanisms.

* * * * *